United States Patent [19]

Miller et al.

[11] Patent Number: 5,213,826
[45] Date of Patent: * May 25, 1993

[54] WHEY PERMEATE-DERIVED SWEETENER

[75] Inventors: Bill L. Miller, Fort Dodge; H. Bruce Perry, Webster City; Robert DeGregorio, Fort Dodge, all of Iowa

[73] Assignee: Land O'Lakes, Inc., Arden Hills, Minn.

[*] Notice: The portion of the term of this patent subsequent to Apr. 23, 2008 has been disclaimed.

[21] Appl. No.: 633,116

[22] Filed: Dec. 19, 1990

Related U.S. Application Data

[63] Continuation of Ser. No. 350,121, May 10, 1989, Pat. No. 5,009,899, which is a continuation-in-part of Ser. No. 116,978, Nov. 5, 1987, abandoned.

[51] Int. Cl.$^5$ ................................. A23K 1/00
[52] U.S. Cl. ........................ 426/2; 426/492; 426/583; 426/623; 426/630; 426/658; 426/807
[58] Field of Search ............... 426/658, 2, 583, 491, 426/492, 807, 623, 630

[56] References Cited

U.S. PATENT DOCUMENTS

| 2,508,112 | 5/1950 | Haugh | 99/2 |
| 3,395,019 | 7/1968 | Kviesitis et al. | 99/2 |
| 3,505,073 | 4/1970 | Bode | 99/9 |
| 3,852,496 | 12/1974 | Weetall et al. | 426/41 |
| 3,930,056 | 12/1975 | Feminella et al. | 426/583 |
| 4,001,198 | 1/1977 | Thomas | 260/112 R |
| 4,012,535 | 3/1977 | Fiala et al. | 426/658 |
| 4,160,041 | 7/1979 | Schroeder et al. | 426/69 |
| 4,165,389 | 8/1979 | de Chaffaut et al. | 426/42 |
| 4,202,909 | 5/1980 | Pederson, Jr. | 426/239 |
| 4,269,864 | 5/1981 | Chirafisi et al. | 426/583 |
| 4,316,749 | 2/1982 | Evans et al. | 127/55 |
| 4,320,150 | 3/1982 | Austin et al. | 426/2 |
| 4,357,358 | 11/1982 | Schanze | 426/62 |
| 4,479,969 | 10/1984 | Bakal et al. | 426/583 |
| 4,542,032 | 9/1985 | Miller | 426/319 |
| 4,547,386 | 10/1985 | Chambers et al. | 426/583 |

FOREIGN PATENT DOCUMENTS 0083327 7/1983 European Pat. Off. .
0397135 11/1990 European Pat. Off. .
2365299 4/1978 France .

OTHER PUBLICATIONS

Guy, "Purification of Sirups from Hydrolyzed Lactose in Sweet Whey Permeate", *Journal of Dairy Science*, vol. 62, No. 3, pp. 384-391, (1979).

Frank B. Morrison, "Feeds and Feeding", The Morrison Publishing Company, Itacha, N.Y., 22nd Edition, 1956, pp. 14-17, 516-519, 1120-1121.

*Primary Examiner*—R. B. Penland

[57] ABSTRACT

The present invention includes a whey permeate-derived dry sweetener made from a condensed whey permeate and a method of feeding animals the dry whey permeate sweetener. The condensed whey permeate is at least partially caramelized and has a protein level of less than approximately 8% and a lactose level of at least approximately 79% on a dry matter basis.

12 Claims, 2 Drawing Sheets

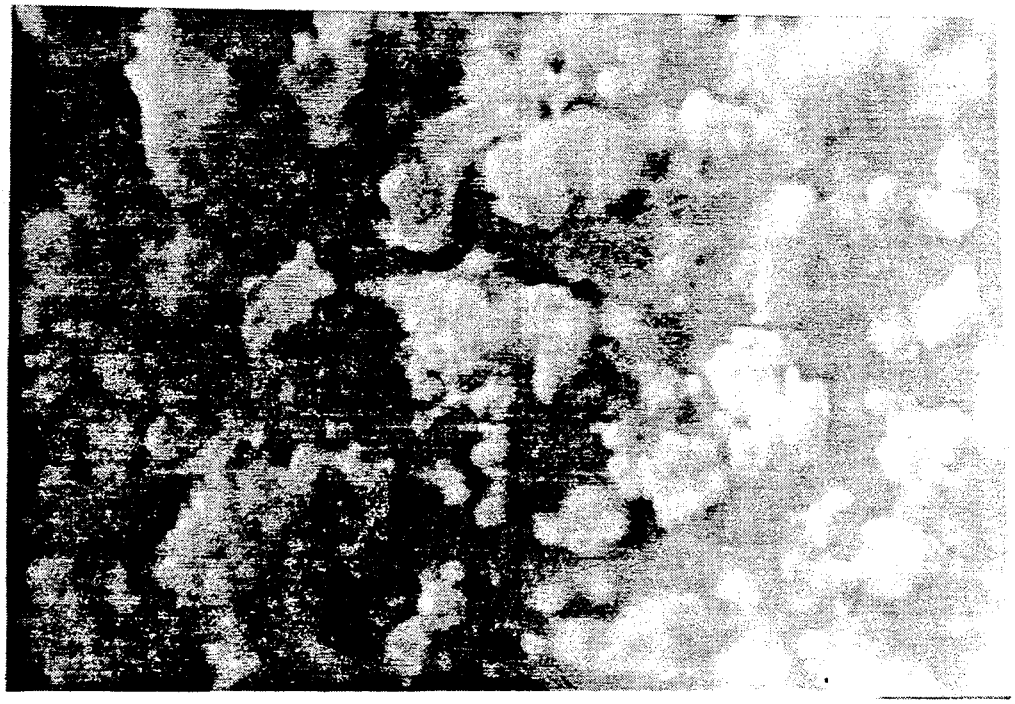
Fig. 1 PRIOR ART
Fig. 2 PRIOR ART

ABSORBANCE VERSUS PERCENTAGE LACTOSE CARMELIZED (WAVELENGTH OF 600 Nm)

WHEY PERMEATE-DERIVED SWEETENER

This is a continuation of application Ser. No. 07/350,121, filed May 10, 1989, which is now U.S. Pat. No. 5,009,899 which is a continuation-in-part of application Ser. No. 07/116,978, filed Nov. 5, 1987 now abandoned.

BACKGROUND OF THE INVENTION

1. Field of the Invention

The present invention relates to food supplements for animals and, in particular, a dry sweetener supplement for animal feed.

2. Description of the Prior Art.

The addition of sweeteners to animal feeds is an old and well-known method of inducing animals to intake more food, or to intake food that is not especially palatable. It is desirable that such sweeteners be low-cost so that the cost of the animal feed is not substantially increased, if at all.

One such sweetener that has been used extensively in the past is molasses. Molasses has been used in attempts to make palatable animal feeds from agricultural by-products which are generally considered not palatable. For example, molasses has been used to coat seed hulls such as sunflowers. A process to impregnate oat hulls with molasses is described in U.S. Pat. No. 3,395,019. The Fiala U.S. Pat. No. 4,012,535 describes a process for impregnating bagasse pith with molasses.

Attempts have also been made to use whey, a cheese by-product of considerable proportion, as an animal feed or animal feed supplement. Whey in the past has been dumped onto fields, in ditches or into rivers and streams. Various governmental regulatory agencies have, for the most part, stopped such practice. Whey is now used extensively as a food additive. Whey's two largest constituents, proteins and lactose, are removed from the whey for use as food additives. The Thomas U.S. Pat. No. 4,001,198 describes a method of recovering nutrients from cheese whey by sequential ultrafiltration, each ultrafiltration step removing as permeate substantial amounts of water and dissolved solids from the respective concentrates. Initially, protein is removed from the whey, then the lactose is removed from the permeate.

A number of patents describe various animal feed or animal feed supplements using whey treated in various manners. For example, the Miller U.S. Pat. No. 4,542,032 is directed to a feed supplement that treats whey with a bisulfite moiety to react the lactose present in the whey and form a lactose-bisulfite addition product. The lactose-bisulfite addition product is more soluble in water than lactose, therefore, the treated whey may be condensed more by removing water without sedimentation of the lactose during condensation or storage. The whey is condensed to about 40-50% solids content. The whey may be utilized directly as an animal feed, or can be blended with another source of nutrients to provide a full ration animal feed.

The Schanze U.S. Pat. No. 4,357,358 describes an animal feedstuff that includes from about 25% to 95% solid structured fibrous agricultural by-product, such as cereal, and from about 75% to about 5% of at least one digestible industrial by-product with nutrient value, one of which could be whey. The whey is a low lactose, protein-enriched whey.

The du Chaffaut et al. U.S. Pat. No. 4,165,389 describes a fermentation process for the production of protein-rich animal feedstuff from a liquid dairy by-product containing lactose and lactic acid which includes cultivating a lactose and lactic acid utilizing strain of a yeast of the genus U.C. Kluyveromyses in the presence of a gas-containing free oxygen and a broth comprising a nitrogen source, the liquid dairy by-product and added nicotinic acid.

The Haugh U.S. Pat. No. 2,508,112 describes a method of making an animal feed mixture including 15%-70% lactose and remainder including protein feed materials. The moisture of the mixture is adjusted to a point where the mixture contains from about 10%-30% water thereby producing a plastic mass, extruding the mixture under heavy pressure, and subdividing the extruded material into pellets.

The Peterson U.S. Pat. No. 4,202,909 describes a method of treating whey to obtain a high yield of relatively pure lactose and salt products. The products are produced from a permeate resulting from ultrafiltration of whey by precipitating calcium and citrate salts from the permeate without substantial precipitation of phosphate salts. The precipitation is done by concentrating the permeate to a solids content of about 40-45% and holding at about 180° F. to 200° F. for 30-90 minutes. The precipitated solids are removed from the permeate and further concentrated and the lactose is removed by crystallization. The permeate is then further spray-dried to produce a product that contains the remaining lactose and is useful as a food or feed.

The Chambers et al. U.S. Pat. No. 4,547,386 describes a process for forming an animal feed block from whey. By-product whey is concentrated to form a whey concentrate having a solids content of at least about 45%. Calcium phosphate is added to the concentrate and the concentrate is then adjusted to a ph of between 4.0 and about 6.0. The concentrate is then poured into a mold and dried to form the feed block.

The Austin et al Patent describes an animal feed that is fortified with a lactose-rich whey product. By lactose-rich is meant that the whey has a lactose content greater than 20% of the solid material, such as dried whole whey, condensed whey and whey solids. The animals are fed a lactose content that is above the normal digested limit of lactose for the animal, providing that the feed is concomitantly supplemented with 0.5% to 5% of a water insoluble polymer based predominantly on N-acetyl-D-glucosamine glycoside.

Others have attempted to mix both molasses and whey to produce an animal feed supplement. In the Schroeder et al. U.S. Pat. No. 4,160,041, a method is described wherein a hydratable metal oxide, such as calcium oxide, is added to a concentrated dispersion of a water soluble sugar, such as molasses, whey and the like to hydrate the metal oxide. After sufficient hydration has occurred, a water soluble phosphate such as phosphoric acid, is added to solidify the product.

The Bode U.S. Pat. No. 3,505,073 describes a process that transforms a dry-feed carbohydrate material, such as whey or molasses, to lactic acid. The dry lactated product is then suitable for use in a feed formulation for animals.

SUMMARY OF THE INVENTION

The present invention includes a whey permeate-derived dry sweetener obtained from a condensed whey permeate being partially caramelized having a protein level of less than approximately 8% and having a solids lactose level of at least approximately 79% on a dry matter basis.

In another aspect, the present invention includes a process for manufacturing a dry animal feed sweetener that includes a condensed whey permeate with a protein level of less than approximately 8% and a lactose level of at least approximately 79% on a dry matter basis. Preferably, the condensed whey permeate (approximately 50% total solids) is disposed on a comestible seed hull by-product and then dried to form the sweetener. The permeate sweetener is usable as a feed supplement or is combinable with other food components to produce a very palatable feed.

In a further aspect, the present invention includes a method of feeding animals a dry whey permeate sweetener including a condensed whey permeate having a protein level of less than approximately 8% and a lactose level of at least approximately 79%. In particular, the present invention includes a method of increasing feed palatability using the dry whey permeate sweetener. Preferably, the condensed whey permeate is combined with a comestible fibrous carrier, such as a seed hull, to form the dry sweetener. The animals are fed the dry whey permeate sweetener with a conventional feed mixture.

BRIEF DESCRIPTION OF THE DRAWINGS

The file of this patent contains at least one drawing executed in color. Copies of this patent with color drawing(s) will be provided by the Patent and Trademark Office upon request and payment of necessary fee.

FIG. 1 is a microphotograph of whey permeate processed by conventional spray drying.

FIG. 2 is a microphotograph of whey permeate processed by air drying techniques.

DETAILED DESCRIPTION OF THE PREFERRED EMBODIMENTS

Figure 3:
FIG. 3 is a microphotograph of the dry whey permeate sweetener of the present invention.

The present invention includes an animal feed containing a dry permeate sweetener obtained from condensed whey permeate having a protein level of less than approximately 8% and having a lactose level of at least approximately 79% on a dry matter basis.

In another aspect, the present invention includes a process for manufacturing a dry animal feed that includes a whey permeate sweetener obtained from the condensed whey permeate. Preferably, the condensed whey permeate is mixed with a comestible seed hull by-product and then the mixture is dried to form the sweetener. For purposes of the present application, the whey permeate of the present invention combined with the comestible material is referred to as a dry sweetener. The dry permeate sweetener is usable as a feed supplement or is combinable with other food components to produce a palatable feed.

In a further aspect, the present invention includes a method of feeding animals a dry whey permeate sweetener including condensed whey permeate having a protein level of less than approximately 8% and a lactose level of at least approximately 79% on a dry matter basis. In particular, the present invention includes a method of increasing feed palatability using the dry whey permeate sweetener. Preferably, the condensed whey permeate is combined with a comestible fibrous carrier, such as a seed hull. The animals are fed the dry whey permeate sweetener with a conventional feed mixture.

Unless otherwise stated, all percentages mentioned are on a weight basis.

The condensed whey permeate is obtained by ultrafiltration, separating the whey proteins from the fluid whey to a level of at least approximately 8% protein in the permeate and preferably to a level of less than 4%, both values based on a dry matter basis. The ultrafiltered permeate is then evaporated. The permeate containing predominantly lactose (at least approximately 79% on a dry matter basis) is then condensed to preferably a solids level of at least 50%.

Table I provides an analysis of the whey permeate on a dry matter basis.

TABLE I

| Dry Permeate Solids | |
| --- | --- |
| Moisture | (2%–7%) |
| Crude Protein | (2.5%–8%) |
| Ash* | (8%–10%) |
| Lactose | (79%–85%) |

*Ash component includes minerals such as sodium, potassium, calcium and phosphorous.

Table II provides an analysis of the condensed permeate in a form that is typically applied to a comestible base such as seed hulls.

TABLE II

| Condensed Whey Permeate | |
| --- | --- |
| Component | |
| Moisture | 42.67–48.37% |
| Solids:[1] | 57.33–51.63% |
| Crude Protein | 8.48% |
| Lactose | 80.13% |
| Ash | 11.29% |
| Fat | .10% |

[1] dry matter basis.

The condensed permeate is then directly applied to seed hulls, such as soy hulls or sunflower hulls, and then dried. Other seed hulls usable as a comestible base include cottonseed hulls, peanut hulls, oat hulls and the like. The permeate may also be coated on fibrous agricultural by-products such as ground corncobs, beet pulp, corn bran and the like.

The condensed whey permeate is applied to the seed hulls in an amount sufficient to coat the seed hulls.

Prior to the present invention, molasses was the material of choice that was combined with seed hulls to make feeds more palatable.

As another aspect of the present invention, the dry whey permeate sweetener is used as a supplement with or as a component of a conventional animal feed. The animal feed typically contains a proteinaceous substance, such as soybean meal, cottonseed meal, or sunflower meal, and an energy component such as corn that is beneficial to the animal. Again, in the prior art, molasses was the material of choice to make conventional feed more palatable to animals.

When the present invention is compared to a dry molasses sweetener-containing feed supplement, the feed intake by the animals of feed containing the dry whey permeate sweetener of the present invention is significantly greater.

Such a result is surprising in view of the relative sweetness between molasses (primarily sucrose (51.7%), glucose (17.0%) and fructose (13.0%)) and lactose. In relative sweetness scales, sucrose is assigned a value of 100, glucose has a value of 60, fructose has a value of 120 and lactose has a value of 39. (*The Encyclopedia of Chemistry*, 3rd Edition, Van Nostrand Reinhold Company, p. 1065.) Animals were fed a feed containing an equal amount of dry permeate sweetener and dry molasses (by weight) each providing similar levels of total sugars. The animals' preference for the dry permeate sweetener-containing feed was significantly higher than their preference for the molasses-containing feed. Set forth below in Table III is an analysis of a commercially available dry molasses sweetener suitable for use in animal feed and the dry permeate sweetener of the present invention.

TABLE III

|  | Moisture | Solids | | | | |
|---|---|---|---|---|---|---|
|  |  | Protein | Fiber | Sugar | Salt | Ash |
| Commercially available dry molasses | 9.85 | 8.84 | 15.07 | 39.10 | 2.10 | 34.89 |
| Whey Permeate Sweetener | 9.10 | 7.30 | 14.99 | 36.65 | 2.90 | 38.16 |

The values of the solids in Table III are expressed on a dry matter basis. The values were obtained from a single sampling of the commercially available dry molasses and the dry permeate sweetener of the present invention.

To produce the dry whey permeate sweetener of the present invention, a 50% total solids permeate having a lactose content of at least 79% and a protein level of less than approximately 8% on a dry matter basis along with soy hulls or other comestible carrier is placed in a conventional mixer and thoroughly mixed. Good product has been produced while using a whey permeate having a solids level of between 30%-55%. The mixture is then placed in a direct fire rotary drum dryer. The residence time of the mixture depends upon the temperature within the dryer relative to the caramelization point of the sugars. For purposes of an example, in preparing one batch of the dry permeate sweetener of the present invention, 2,240 pounds of condensed permeate was mixed with 845 pounds of soy hulls having approximately a 10% moisture content. The inlet temperature of the dryer was 1,090° F. and the air exit temperature of the dryer was between 300° F.-320° F. The product exiting the dryer had a temperature of 230° F.-270° F. A total of 2,000 pounds of permeate sweetener having a moisture content of approximately 5% was produced. The lactose was at least partially caramelized.

FIG. 1 includes a photomicrograph of a spray-dried whey permeate. FIG. 2 includes a photomicrograph of an air dried condensed whey permeate. FIG. 3 includes a photomicrograph of the partially caramelized dry whey permeate sweetener of the present invention. All photomicrographs were taken at 210× magnification through a Microstar light microscope (AP Scientific Instruments, Buffalo, N.Y.). The visibly smaller lactose crystals in FIG. 1 are believed due to the rapid drying which occurs in a conventional spray-drying process. The crystals in FIG. 3 were a result of the permeate sweetener of the present invention being sieved through a 34 mesh screen to separate crystals from fibrous material.

Air dried condensed whey permeate, as illustrated in FIG. 2, is not subjected to temperatures which will cause caramelization (browning) of the whey permeate. The process of condensing whey permeate and then air drying is such that the moisture protects the whey permeate from reaching caramelization temperatures. Spray-dried whey permeate, as illustrated in FIG. 1, is condensed whey permeate processed further in a spray dryer. Again, the moisture in the whey permeate during spray drying prevents the whey permeate from browning.

For purposes of the present invention, a colormetric assay was developed to quantify the extent of caramelization of the permeate sweetener of the present invention. Complete caramelization was obtained by subjecting 200 grams of spray-dried permeate (which contained approximately 85% lactose) to a pressure of 17 PSI and a temperature of 244° F. for 60 minutes in an autoclave (by Consolidated Stills and Sterilizers, Boston, Mass.). A standard curve was developed by dissolving levels of total caramelized lactose with non-caramelized lactose (as produced by an air drying technique) and distilled water. 5% solutions on a weight to volume ratio were obtained according to the following table:

| Solution Number | gms Totally Caramelized Lactose | gms Non-Caramelized Lactose |
|---|---|---|
| 1 | .50 | .00 |
| 2 | .30 | .20 |
| 3 | .20 | .30 |
| 4 | .10 | .40 |
| 5 | .00 | .50 |

Figure 4:
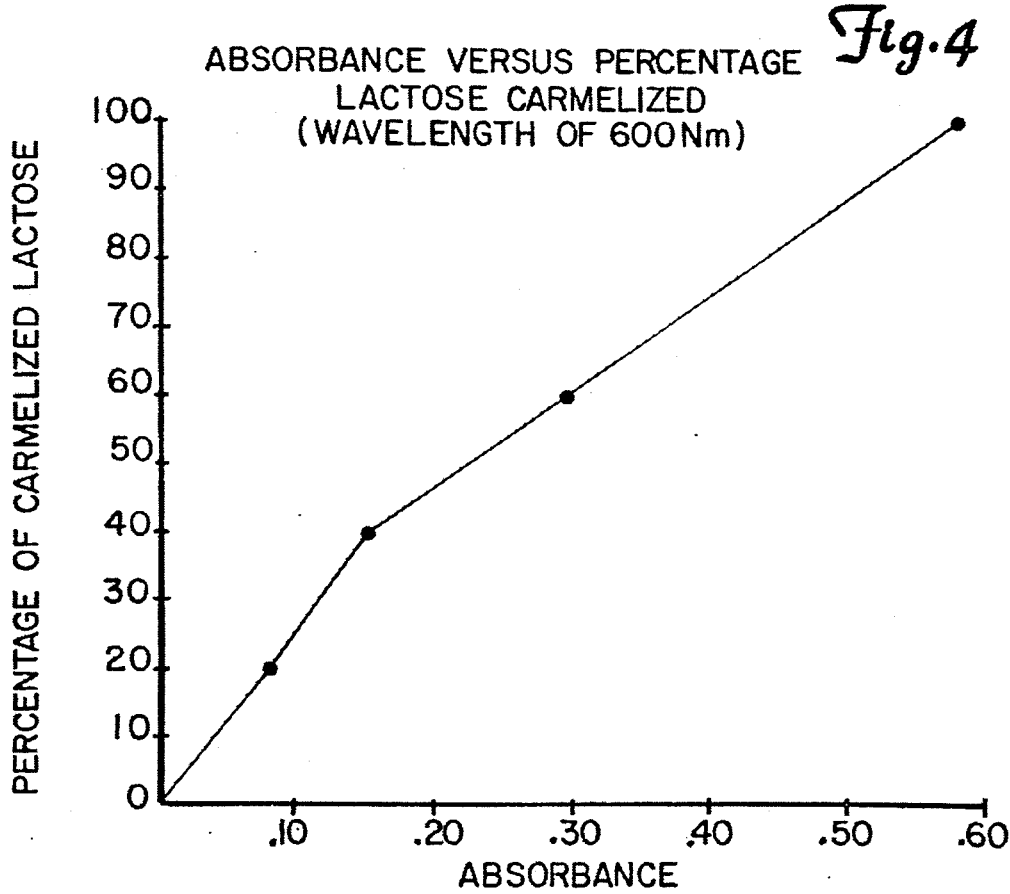
FIG. 4 is a graph of absorbance versus percentage of caramelized lactose.

All solutions were filtered (Grade 048, ED filter paper-Eaton Dikeman, Mount Holly Springs, Pa.) to remove lactose crystals leaving a solubilized under coloration. Absorbance was measured at a wavelength of 600 nm (Spectronic-20, Bausch and Lomb, Inc., Rochester, N.Y.) and a standard curve was developed as illustrated in FIG. 4 by graphing absorbance versus percentage caramelized lactose.

Percentage caramelized lactose in the permeate sweetener of the present invention was determined by screening (using 34 mesh) to obtain primarily lactose. Any small fiber particles were later removed by solubilization and filtering. A 5% solution (weight to volume) and distilled water was used for colormetric determination as previously discussed. For purposes of the present invention, by partial caramelization is meant at least approximately 10% of the lactose is caramelized. The absorbance level of lactose from the whey permeate sweetener of the present invention was approximately 0.2, which translates to approximately 47% caramelization according to the graph of FIG. 4. Whey permeate of the present invention which has been caramelized to approximately 95 to 100% has also been found suitable.

A further processed permeate may also be used to produce a dry sweetener and will be referred to as a delactose permeate for producing a delactose dry sweetener. In actuality, such a sweetener includes lactose but at a lower level. The delactose condensed permeate has a solids content of approximately 46% and sugar (lactose) content on a dry matter basis of 31.17%. The delactose dry sweetener of the present invention is produced in the same manner as the dry sweetener previously discussed. Table IV, set forth below, includes an analysis of the condensed dry sweetener (delactose condensed permeate and comestible seed hull):

TABLE IV

| Crude Protein | 8.8% | |
|---|---|---|
| Crude Fiber | 19.5% | |
| Phosphorus | .88% | Solids = 94.5% |
| Calcium | .58% | |
| Sugars | 21.5% | |
| Salt | 4.6% | |
| | | Moisture = 5.5% |

(Other ash components not assay)

The above condensed delactose dry sweetener was found to make animal feed more palatable.

However, its preference by the animals was not as good as the higher content lactose sweetener.

The following examples are included to illustrate the present invention and are not intended to limit the present invention in any way.

EXAMPLE 1

A dry molasses sweetener-containing feed and a dry whey permeate sweetener-containing feed were prepared and fed in a trial to Holstein heifers. Whey permeate, as described previously, was prepared by ultrafiltration, removing the protein with the permeate being collected. The permeate was subsequently condensed to a solids level of approximately 50%. 2,240 pounds of condensed permeate was coated on 845 pounds of soy hulls. In this example, the whey permeate sweetener was caramelized to approximately 47% according to the graph of FIG. 4.

The molasses used in preparing the molasses sweetener-containing feed was a dry molasses commercially available from West Bend Processing, West Bend, Iowa. The molasses is a 70% TS molasses (liquid). 1,600 pounds of the molasses was coated (dried) on 845 pounds of soy hulls to provide a similar total sugars level as the dry permeate sweetener.

Both the molasses sweetener and the whey permeate sweetener of the present invention were incorporated into the feed. The sweetener-containing feed was pelletized and used as a supplement in a feed having the composition set forth below. The "calculated analysis" indicates that both feeds contained equal amounts of protein, fat and fiber.

| Ingredient | Molasses Sweetener-Containing Feed | Whey Permeate Sweetener Containing Feed |
|---|---|---|
| Ground corn (%) | 34.50 | 34.50 |
| Soybean meal (44CP) (%) | 16.30 | 16.30 |
| Wheat midds (%) | 28.94 | 28.94 |
| Ground oats (%) | 8.00 | 8.00 |
| Dried whey (%) | 1.25 | 1.25 |
| Dry molasses (%) | 10.00 | — |
| Whey permeate sweetener (%) | — | 10.00 |
| Limestone (%) | .74 | .74 |
| 5X Cat. Vit. premix (%) | .04 | .04 |
| Antibiotic (%) | .02 | .02 |
| Trace minerals (%) | .06 | .06 |
| Selenium 200 premix (%) | .11 | .11 |
| Cellulose gum (%) | .04 | .04 |
| | 100.00 | 100.00 |
| Calculated Analysis: | | |
| Crude protein (%) | 16.00 | 16.00 |
| Fat (%) | 3.00 | 3.00 |
| Fiber (%) | 8.00 | 8.00 |

During the trial, seven Holstein heifers were fed for five days. Observations were taken on the first, second and fifth day. Each Holstein heifer was housed in an individual pen. All the heifers employed in the trial were fed hay approximately 3–4 hours prior to feeding of the dry molasses sweetener-containing feed and the dry whey permeate sweetener-containing feed.

The trial was designed to offer the heifers the molasses sweetener-containing feed and the whey permeate sweetener-containing feed to determine if a preference existed for one feed or the other. Each heifer was offered five pounds of molasses sweetener-containing feed and five pounds of the whey permeate sweetener-containing feed simultaneously. The feeds were placed in individual, spaced-apart feeders and the position of the feeds were changed each day, that is, the molasses sweetener-containing feed was moved from one feeder to the other and the whey permeate sweetener-containing feed was moved also from one feeder to the other to eliminate any biases by an individual heifer as to a particular feeder and not to the feed. The feeders employed were of similar design. Both feeds were offered to each animal for exactly five minutes, and after five minutes, the feed was removed and weighed to determine feed intake.

Five of the heifers were pregnant and two were not and five heifers weighed approximately 975 and two heifers weighed approximately 1,200 pounds.

The results of the observations taken on day one, day two and day five of the trial are listed below.

| | Average Daily Feed Intake | | | |
|---|---|---|---|---|
| Animal No. | Day 1 | Day 2 | Day 5 | Average |
| Molasses Sweetener-Containing Feed | | | | |
| 598 | .723 | .282 | .423 | .476 |
| 595 | .599 | .053 | .229 | .294 |
| 599 | .229 | .018 | .053 | .100 |
| 600 | .159 | .405 | 1.091 | .552 |
| 001 | 1.992 | 0 | 1.622 | 1.205 |
| 002 | .687 | .564 | 1.604 | .952 |
| 596 | .141 | 0 | 0 | .047 |
| | .647 | .189 | .717 | .518 |
| Whey Permeate Sweetener-Containing Feed | | | | |
| 598 | 2.465 | 2.554 | 2.713 | 2.577 |
| 595 | 2.554 | 3.086 | 3.458 | 3.033 |
| 599 | 2.430 | 2.660 | 3.607 | 2.899 |
| 600 | 2.500 | 2.004 | 2.039 | 2.181 |
| 001 | 2.110 | 3.405 | 2.642 | 2.719 |
| 002 | 4.398 | 3.919 | 3.245 | 3.854 |
| 596 | 2.571 | 2.696 | 3.015 | 2.761 |
| | 2.718 | 2.903 | 2.960 | 2.860 |

The heifers in the trial chose the whey permeable sweetener-containing feed on an average ratio of 5.52:1.00. Statistically, it was found that the data was significantly different at a probability of less than 0.001. In 100% of the observations, the heifers preferred the dry permeate sweetener-containing feed over the molasses sweetener-containing feed.

EXAMPLE 2

A second trial was conducted and was designed for specifically smaller, and much more timid animals weighing approximately 300 pounds. The same feed formulation for both the molasses sweetener-containing feed and the whey permeate sweetener-containing feed was used in this trial as in Example 1.

The trial was conducted over a three-day period and observations were taken on each of the three days.

Six Holstein heifers were used and each was housed in an individual pen. All the heifers employed in this trial were fed hay on the evening prior to feeding of the dry molasses sweetener-containing feed and the dry whey permeate sweetener-containing feed.

On the day of the trial, each heifer was offered five pounds of the dry molasses sweetener-containing feed and five pounds of the dry whey permeate sweetener-containing feed. The feeds were offered simultaneously in individual feeders. The position of the feeds was reversed each day to eliminate any bias of an individual heifer. Both feeds were offered to each animal for exactly 15 minutes, and after 15 minutes, the feed was removed and weighed to determine the feed intake by the animals. Each of the six heifers weighed approximately 300 pounds and the heifers ranged in age from three months to four months. The results of the trial are set forth in the tables below.

| Animal No. | Average Daily Feed Intake (lbs.) | | | |
|---|---|---|---|---|
| | Day 1 | Day 2 | Day 3 | Average |
| Molasses Sweetener-Containing Feed | | | | |
| 649 | 1.040 | 1.084 | 1.647 | 1.257 |
| 644 | .130 | .477 | .439 | .217 |
| 646 | .867 | .390 | .086 | .448 |
| 651 | 1.430 | 0 | .086 | .505 |
| 645 | .130 | 0 | .520 | .217 |
| 642 | .867 | 2.037 | 2.514 | 1.806 |
| | .744 | .665 | .816 | .742 |
| Whey Permeate Sweetener-Containing Feed | | | | |
| 649 | .478 | 1.695 | 1.738 | 1.304 |
| 644 | 1.608 | 2.303 | 3.607 | 2.506 |
| 646 | 2.303 | 2.557 | 3.303 | 2.721 |
| 651 | .130 | 3.042 | 3.303 | 2.158 |
| 645 | .087 | 3.259 | 2.477 | 1.941 |
| 642 | 1.347 | 2.042 | 1.260 | 1.550 |
| | .992 | 2.483 | 2.615 | 2.030 |

The average daily intake ratio of the whey permeate sweetener-containing feed to the molasses sweetener-containing feed was 2.74:1.00. This data was found to be significantly different ($p \leq 0.005$). In 77.8% of the observations, the heifers preferred the whey permeate sweetener-containing feed over the molasses sweetener-containing feed.

EXAMPLE 3

A dry molasses sweetener-containing feed and whey permeate sweetener-containing feed were prepared according to the formulation as described in Example 1. Six Holstein calves were employed in the trial of this example. The average weight of the calves was 150 pounds. The trial was conducted for four days.

Both feeds were offered simultaneously to the calves for a six-hour period daily, from 10 a.m. to 4 p.m. The calves were housed individually in crates containing two bucket holes. The locations of the feed was switched daily to avoid any biases by the calves. Calves were watered twice each day (8 to 10 a.m.; 4 to 5 p.m.) with the location of the water bucket switched daily. The remainder of the time (5 p.m. to 8 a.m.) the calves were fed a non-sweetened basal diet of corn, oats and soybean meal which was offered in both buckets.

The results of the trial are set forth in the table below.

| Animal No. | Average Daily Feed Intake (grams) | | | | |
|---|---|---|---|---|---|
| | Day 1 | Day 2 | Day 3 | Day 4 | Average |
| Molasses Sweetener-Containing Feed | | | | | |
| 46 | 16 | 213 | 2 | 5 | 59.0 |
| 47 | 213 | 52 | 153 | 412 | 207.5 |
| 48 | 107 | 82 | 31 | 54 | 68.5 |
| 49 | 30 | 47 | 156 | 366 | 149.8 |
| 50 | 8 | 275 | 0 | 11 | 73.5 |
| 51 | 39 | 86 | 55 | 32 | 53.0 |
| | 85.3 | 125.8 | 66.2 | 146.7 | 101.9 |
| Whey Permeate Sweetener-Containing Feed | | | | | |
| 46 | 20 | 183 | 2 | 12 | 54.3 |
| 47 | 192 | 736 | 706 | 801 | 608.8 |
| 48 | 288 | 402 | 589 | 400 | 419.8 |
| 49 | 356 | 320 | 360 | 239 | 318.8 |
| 50 | 249 | 771 | 762 | 584 | 591.5 |
| 51 | 126 | 246 | 259 | 170 | 200.3 |
| | 205.2 | 443.0 | 445.8 | 367.2 | 365.6 |

As the results show, the calves preferred the feed containing the dry whey permeate sweetener of the present invention to the dry molasses sweetener-containing feed on an average daily ratio of 3.59:1.00. In 83.3% of the observations, the calves favored the whey permeate sweetener-containing feed over the molasses sweetener-containing feed ($p < 0.01$).

EXAMPLE 4

This example illustrates preference by calves of the caramelized sweetener of the present invention in contrast to a product containing non-caramelized spray-dried whey permeate as a sweetener. The whey permeate sweetener was partially caramelized (47%) while the spray-dried material was processed so that no caramelization occurred. The Table below sets forth the formulation of each of the feeds. For each feed, the formulation was kept the same except for the permeate. However, in each case, the lactose content was kept the same.

| | Whey Permeate Sweetener Feed | Spray-Dried Whey Permeate Feed |
|---|---|---|
| Formulation: | | |
| Vitamin premix | .19 | .19 |
| Trace mineral premix | .36 | .36 |
| Cellulose gum | .04 | .04 |
| Soybean meal | 16.00 | 16.00 |
| Wheat midds | 24.00 | 24.00 |
| Dried whey | 1.25 | 1.25 |
| Limestone | .60 | .60 |
| Salt | .09 | .09 |
| Ground corn | 37.47 | 37.47 |
| Ground oats | 10.00 | 10.00 |
| Soy hulls | — | 4.23 |
| Whey permeate sweetener | 10.00 | — |
| Spray-dried whey permeate | — | 5.77 |
| | 100.00 | 100.00 |
| Expected Analysis: | | |
| Protein, % | 16.00 | 16.00 |
| Fiber, % | 5.90 | 5.90 |
| Lactose, % | 5.75 | 5.75 |

The above feeds were fed to calves over a four day period. The feeds were offered for six hours daily (10:00 a.m. to 4:00 p.m.). Locations of each feed were switched daily. Water was offered twice daily (8 to 10 a.m.; 4 to 5 p.m.) and the location of water buckets was switched at each watering to reduce the chance of biasing data. Ten approximately 130 pound calves were individually housed in crates. The remainder of the time (5:00 p.m. to 8:00 a.m.), the calves were fed a non-sweetened basal diet of corn, oats, and soybean meal which was offered in both buckets.

The results of the daily consumption of each animal is set forth in the Table below. Each calf is identified by number.

| | Average Daily Feed Intake (Pounds) | | | | |
|---|---|---|---|---|---|
| Animal No. | Day 1 | Day 2 | Day 3 | Day 4 | Average |
| Whey Permeate Sweetener-Containing Feed | | | | | |
| 21 | .18 | .22 | 0 | .13 | .13 |
| 22 | .40 | .44 | .49 | .53 | .47 |
| 23 | .04 | .18 | .44 | .58 | .31 |
| 24 | .22 | .67 | .49 | .44 | .46 |
| 25 | .53 | .66 | .49 | .84 | .63 |
| 26 | .44 | .44 | .44 | .67 | .50 |
| 27 | .44 | .76 | 1.42 | .36 | .75 |
| 28 | .36 | .40 | .13 | .22 | .28 |
| 29 | .49 | .44 | .44 | .49 | .47 |
| 30 | .40 | .53 | .44 | .67 | .51 |
| | .35 | .47 | .48 | .49 | .45 |
| Spray-Dried Permeate-Containing Feed | | | | | |
| 21 | .27 | .35 | .13 | .27 | .26 |
| 22 | .18 | .13 | .13 | .13 | .14 |
| 23 | .35 | .31 | .22 | .04 | .23 |
| 24 | 0 | 0 | 0 | .04 | .01 |
| 25 | 0 | 0 | 0 | .04 | .01 |
| 26 | .09 | .31 | .31 | .22 | .23 |
| 27 | 0 | .04 | .04 | .04 | .03 |
| 28 | 0 | 0 | .22 | .21 | .11 |
| 29 | .09 | .04 | .13 | .04 | .08 |
| 30 | .13 | 0 | 0 | .04 | .04 |
| | .11 | .19 | .12 | .11 | .11 |

As the results show, the calves on the average overwhelming preferred the feed containing the caramelized whey permeate sweetener of the present invention to the non-caramelized spray-dried permeate-containing feed.

The results show that the whey permeate-sweetener containing feed was preferred to spray-dried permeate-containing feed by a ratio of 4.09:1.00 with 82.5% of the observations favoring the whey permeate sweetener-containing feed. The difference in consumption was significantly different at a probability of less than 0.05.

EXAMPLE 5

A dry molasses sweetener-containing feed and a whey permeate sweetener-containing feed of the present invention were prepared according to the formulation as set forth in the Table below.

| | Dry Molasses Sweetener-Containing Feed | Whey Permeate Sweetener-Containing Feed |
|---|---|---|
| Formulation: | | |
| Vitamin premix | .12 | .12 |
| Trace mineral premix | .11 | .11 |
| Antibiotic | .02 | .02 |
| Ammonium chloride | .50 | .50 |
| Grd. corn | 32.90 | 32.90 |
| Grd. soy hulls | 10.00 | 10.00 |
| Soybean meal | 28.35 | 28.35 |
| Wheat midds | 16.50 | 16.50 |
| Dried whey | 1.25 | 1.25 |
| Dry molasses | 7.50 | — |
| Permeate sweetener | — | 7.50 |
| Dicalcium | 1.15 | 1.15 |

| | Dry Molasses Sweetener-Containing Feed | Whey Permeate Sweetener-Containing Feed |
|---|---|---|
| phosphate | | |
| Limestone | .60 | .60 |
| Salt | 1.00 | 1.00 |
| | 100.00 | 100.00 |
| Expected Analysis: | | |
| Protein, % | 20.20 | 20.20 |
| Fat, % | 2.20 | 2.20 |
| Fiber, % | 8.00 | 8.00 |

Twelve lambs weighing approximately 32 pounds each were assigned to six pens with two lambs per pen.

Both feeds were offered simultaneously to the lambs for two days. The locations of the feed were switched daily to avoid any biases of the lambs. The feeds were fed in a pelletized form and the amounts consumed were measured daily and are set forth in the Table below.

| | Average Daily Intake by Lambs (Pounds) | | |
|---|---|---|---|
| Pen No. | Day 1 | Day 2 | Average |
| Dry Molasses-Containing Feed | | | |
| 1 | .60 | .20 | .40 |
| 2 | .80 | .80 | .80 |
| 3 | .20 | .45 | .32 |
| 4 | .50 | .85 | .68 |
| 5 | .10 | 1.00 | .55 |
| 6 | .05 | .10 | .08 |
| | .375 | .567 | .471 |
| Whey Permeate Sweetener-Containing Feed | | | |
| 1 | .55 | 1.05 | .80 |
| 2 | 1.10 | 1.25 | 1.17 |
| 3 | 1.05 | 1.60 | 1.33 |
| 4 | 1.20 | .60 | .90 |
| 5 | .75 | .35 | .50 |
| 6 | .30 | 1.85 | 1.08 |
| | .825 | 1.117 | .971 |

As the results show, the lambs on the average overwhelming preferred the whey permeate sweetener-containing feed. The lambs prefer the whey permeate sweetener-containing feed by over 2.06:1.00 compared to a similar diet containing dry molasses 0.971 pounds/head/day vs. 0.471 pounds/head/day). Lambs offered a choice, preferred the permeate containing feed in 75% of the observations (p<0.05).

Although the present invention has been described with reference to preferred embodiments, workers skilled in the art will recognize that changes may be made in form and detail without departing from the spirit and scope of the invention.

What is claimed is:

1. A method of feeding animals comprising:
   providing a whey permeate sweetener including a condensed whey permeate having at least 10% caramelized lactose and having a protein level of less than approximately 8% and a lactose level of at least approximately 79%, on a dry matter basis by weight; and
   feeding the sweetener to animals.

2. The method of claim 1 wherein the condensed whey permeate includes a solids level of between 30% and 55% by weight.

3. The method of claim 2 wherein the solids level of the condensed whey permeate is at least 50% by weight.

4. The method of claim 1 wherein the whey permeate sweetener is fed to the animals along with a proteinaceous feed.

5. A method of increasing palatability of animal feed comprising:
providing a whey permeate sweetener made from a condensed whey permeate having at least 10% caramelized lactose and having a protein level of less than approximately 8% and a lactose level of at least approximately 79% on a dry matter basis by weight;
feeding the whey permeate sweetener to animals with a proteinaceous feed.

6. The method of claim 5 wherein the condensed whey permeate includes a solids level of between 30% to 55% by weight.

7. The method of claim 6 wherein the solids level of the condensed whey permeate is at least 50% by weight.

8. A method of producing an animal feed comprising:
providing a whey permeate sweetener having at least 10% caramelized lactose and having a protein level of less than approximately 8% and a lactose level of at least approximately 79% on a dry matter basis by weight; and
mixing the whey permeate sweetener with a proteinaceous animal feed.

9. The method of claim 8 wherein the whey permeate sweetener has a solids level of between approximately 30% to 55%.

10. The method of claim 9 wherein the condensed whey permeate has a solids level of at least 50% by weight.

11. An animal feed comprising:
a condensed whey permeate having at least 10% caramelized lactose and having a protein level of less than approximately 8% and a lactose level of at least approximately 79% on a dry matter basis by weight.

12. The animal feed of claim 11 and further including a proteinaceous feed mixture.

* * * * *